(12) United States Patent
Kikuchi et al.

(10) Patent No.: US 8,087,230 B2
(45) Date of Patent: Jan. 3, 2012

(54) EXHAUST SYSTEM FOR MOTOR VEHICLES

(75) Inventors: Hiroyuki Kikuchi, Kobe (JP);
Tomoyuki Takeshita, Kobe (JP);
Tetsuya Mori, Kobe (JP); Akira Soeda,
Kobe (JP); Shin Yasuchika, Kakogawa
(JP); Makoto Momosaki, Kakogawa
(JP); Hidehiko Yamamoto, Kobe (JP)

(73) Assignee: Kawasaki Jukogyo Kabushiki Kaisha,
Hyogo (JP)

( * ) Notice: Subject to any disclaimer, the term of this patent is extended or adjusted under 35 U.S.C. 154(b) by 921 days.

(21) Appl. No.: 12/103,270

(22) Filed: Apr. 15, 2008

(65) Prior Publication Data
US 2008/0256927 A1  Oct. 23, 2008

(30) Foreign Application Priority Data

Apr. 18, 2007 (JP) .................................. 2007-109655

(51) Int. Cl.
*F01N 3/00* (2006.01)
(52) U.S. Cl. ................ 60/276; 60/299; 60/302; 60/323; 60/324
(58) Field of Classification Search ..................... 60/272, 60/276, 299, 305, 323, 324, 302
See application file for complete search history.

(56) References Cited

U.S. PATENT DOCUMENTS

| 4,261,170 | A | | 4/1981 | Suzuki | |
|---|---|---|---|---|---|
| 4,484,440 | A | * | 11/1984 | Oki et al. | 60/276 |
| 6,082,103 | A | * | 7/2000 | Sugiura et al. | 60/323 |
| 6,722,126 | B2 | * | 4/2004 | Kawamizu | 60/324 |
| 6,725,655 | B2 | * | 4/2004 | Yoshirawa et al. | 60/323 |
| 7,454,901 | B2 | * | 11/2008 | Kato et al. | 60/324 |
| 7,610,748 | B2 | * | 11/2009 | Kono et al. | 60/276 |
| 2006/0053780 | A1 | | 3/2006 | Kikuchi et al. | |

FOREIGN PATENT DOCUMENTS

| JP | 54-047923 | 4/1979 |
|---|---|---|
| JP | 58-53829 | 4/1983 |
| JP | 64-8521 | 1/1989 |
| JP | 06-026375 | 2/1994 |
| JP | 2006-077727 | 3/2006 |

OTHER PUBLICATIONS

Japanese Application No. 2007-109655 Office Action dated Jan. 25, 2011, 5 pages including English translation.

* cited by examiner

*Primary Examiner* — Binh Q Tran

(57) ABSTRACT

An exhaust system for discharging exhaust gases through an exhaust passageway, emitted from a multi-cylinder combustion engine mounted on a motor vehicle includes a partition plate formed therein for dividing the exhaust passageway into a plurality of juxtaposed exhaust passages and having a communicating hole defined therein, and an exhaust gas sensor positioned at a location in proximity of the communicating hole for detecting a composition of the exhaust gases.

18 Claims, 7 Drawing Sheets

PRIOR ART

EXHAUST SYSTEM FOR MOTOR VEHICLES

BACKGROUND OF THE INVENTION

1. Field of the Invention

The present invention relates to an exhaust system that is mounted on a motor vehicle such as, for example, a motorcycle for discharging exhaust gases emitted from a combustion engine of the motor vehicle.

2. Description of the Prior Art

The conventional exhaust system is so designed and so structured that a catalyst is built in a muffler and exhaust gases emitted from the combustion engine are, after having been substantially purified with the use of a catalytic converter disposed inside the muffler, discharged to the atmosphere. In view of upwelling of consideration to the environment in these years, the exhaust system disclosed in, for example, the Japanese Patent No. 3026684, published in Jan. 28, 2000, includes the catalytic converter positioned in an intermediate portion of an exhaust passageway, and an exhaust gas sensor positioned upstream of the catalytic converter with respect to the direction of flow of the exhaust gases, so that with the catalyst held in the vicinity of the exhaust ports, the catalyst can readily be activated immediately after the cold start.

It has, however, been found that since in the exhaust system of the type described above, a plurality of exhaust passages are merged at a location upstream of the catalytic converter to provide a single exhaust passage, a portion of the exhaust system, where the plural exhaust passages reside, tends to be shortened and, therefore, an increase of the engine output at a medium speed region is not sufficient. In view of this, the Japanese Laid-open Patent Publication No. 2006-077727, published in Mar. 23, 2006, suggests dividing a portion of the exhaust passage upstream of the catalytic converter into two zones by means of a partition plate so that the engine output at the medium speed region can be increased. However, if the exhaust passage is divided by the partition plate such as suggested in the Japanese Laid-open Patent Publication No. 2006-077727 mentioned above, an exhaust gas sensor need be installed in each of passages so divided by the partition plate, resulting in increase of the number of component parts, weight and cost.

SUMMARY OF THE INVENTION

In view of the foregoing, an object of the present invention is to provide an exhaust system for an motor vehicle, in which a partition plate is provided in a plurality of header pipes to allow a plurality of exhaust passages so divided by the partition plate to have a substantial length to allow the engine output at the medium speed region to be increased and in which only one exhaust gas sensor is employed to thereby suppress an increase in number of component part, weight and cost, and a motorcycle employing the exhaust system of a type referred to above.

In order to accomplish these objects of the present invention, the exhaust system is designed for discharging exhaust gases through an exhaust passageway, emitted from a multicylinder combustion engine mounted on a motor vehicle and includes a partition plate dividing the exhaust passageway into a plurality of juxtaposed exhaust passages and having a communicating hole defined therein, and an exhaust gas sensor, positioned at a location close to the communicating hole, for detecting a composition of the exhaust gases.

According to the present invention, since the exhaust system includes a plurality of exhaust passages divided by the partition plate, the engine output at the medium speed region can be increased when the length of the partition plate is properly selected. Also, since the divided exhaust passages are communicated with each other through the communicating hole, the use of the only exhaust gas sensor is sufficient to accomplish a measurement in the entire exhaust passages and, thus, the number of exhaust gas sensors to be used can be reduced to thereby reduce the number of component parts, weight and cost.

The exhaust system may preferably includes a catalytic converter disposed in a portion of the exhaust passageway downstream of the communicating hole with respect to the direction of flow of the exhaust gases. According to this feature, the composition of the exhaust gases immediately before entering into the catalytic converter can be detected and, based on a result of detection, the air-fuel ratio in the fuel intake system of the engine and the amount of a secondary air to be injected into the exhaust ports are controlled efficiently. Therefore, the substantial purifying functionality of the catalytic converter can be maintained.

The exhaust system of the kind referred to above may additionally include a plurality of header pipes fluid connected with a plurality of engine cylinders of the combustion engine and forming a part of the exhaust passageway and an exhaust collector pipe fluid connected with the plural header pipes which are merged together. In this case, the catalytic converter is disposed within the exhaust collector pipe and the exhaust gas sensor is positioned in the vicinity of and on an upstream side of the catalytic converter.

Where the output performance of the engine at the low speed region is desired to be maintained at a high level, the exhaust collector pipe having a round cross-sectional shape is preferred in terms of an increase of the engine output. If this exhaust collector pipe is fitted with the exhaust gas sensor, a sensor boss is needed to be provided at a mounting portion where the exhaust gas sensor is mounted and, for this reason, the mounting portion tends to be flat. As a result thereof, the cross-sectional shape of the exhaust collector pipe comes to be noncircular having a portion thereof which represents a flat shape. Accordingly, when the only exhaust gas sensor is employed, it is possible to render the exhaust collector pipe to have a cross-sectional shape, where a flat portion is minimized and which represents near to the round shape, for example, in which ¾ or more of the circumference thereof represents a round shape. As a result, the number of manufacturing and fitting steps of the sensor boss can be reduced advantageously, and further, an undesirable reduction of the engine output at the low speed region can be prevented, enabling a smooth acceleration.

In a preferred embodiment of the present invention, a portion of the exhaust passage in the exhaust collector pipe upstream of the catalytic converter is divided into upper and lower introducing passages by the partition plate, with the exhaust gas sensor fitted to the exhaust collector pipe so as to confront the upper introducing passage. This is particularly advantageous in that since there is no need to fit the exhaust gas sensor to the lower introducing passage, it is possible to secure a large angle of bank while an undesirable contact of the exhaust sensor and a covering therefor with any obstructions during the travel of the motor vehicle is avoided. Also, while a lower portion of the exhaust collector pipe is apt to be chilled under the influence of muddy water or the like and the sensor tends to be adversely affected by a condensate liquid of the exhaust gases generated as a result of cooling, those problems can be avoided as a result that no exhaust gas sensor is required in the lower introducing passage.

In another preferred embodiment of the present invention, the distance L1 from a geometric center of the communicating hole to an upstream end face of the catalytic converter is chosen to be within the range of 0.3 to 0.6 D and, more preferably, within the range of 0.4 to 0.5 D, where D represents an inner diameter of the exhaust collector pipe. This is particularly advantageous in it is possible to avoid introduction of the exhaust gases into the catalytic converter before the exhaust gases are sufficiently mixed together through the communicating hole.

The sensor boss referred to above may be preferably mounted on the exhaust collector pipe for supporting the exhaust gas sensor, in which case a vibration suppressing weight is disposed in the vicinity of the sensor boss.

In a further preferred embodiment of the present invention, the exhaust gas sensor may have a leading end oriented towards a geometric center of the communicating hole. The distance L2 between the leading end of the exhaust gas sensor and the geometric center of the communicating hole is chosen to be within the range of preferably 0.15 to 0.40 D and, more preferably, 0.20 to 0.35 D, where D represents an inner diameter of the exhaust collector pipe. This is particularly advantageous in that since the leading end of the exhaust gas sensor is brought in proximity of the communicating hole, a high precision of detection of the exhaust gas can be maintained.

In a still further preferred embodiment of the present invention, the communicating hole may have a diameter d which is chosen to be within the range of preferably 0.10 to 0.25 D and, more preferably, 0.15 to 0.20 D, where D represents an inner diameter of the exhaust collector pipe. This is particularly advantageous in that an undesirable reduction in engine performance, which would otherwise result from an increase of the diameter d of the communicating hole can be suppressed, while the exhaust gases can be substantially purified.

In a still further preferred embodiment of the present invention, the exhaust system of the present invention may be of a design including four header pipes fluid connected with a four cylinder combustion engine, a single catalytic converter disposed in the exhaust collector pipe, in which in a portion of the exhaust collector pipe upstream of the catalytic converter with respect to the direction of flow of the exhaust gases, the introducing passages, each fluid connected with two of the four header pipes that are merged together, are defined by the partition plate. According to this structural feature, since the exhaust gases emitted from the four cylinder combustion engine can be substantially purified by the single catalytic converter, the reduction in number of component parts and the cost can be reduced. The exhaust gas sensor referred to hereinbefore is, for example, of a type capable of detecting the amount of oxygen.

Also, the exhaust system of the present invention can be suitably employed in the motorcycle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, preferred embodiments of the present invention will be described in detail with particular reference to the accompanying drawings. Before the detailed description of the preferred embodiments of the present invention proceeds, it is to be noted that the terms "upstream" and "downstream" used hereinbefore and hereinafter are a relative term used with respect to the direction of flow of the exhaust gases from the motorcycle engine toward the atmosphere.

Figure 1:
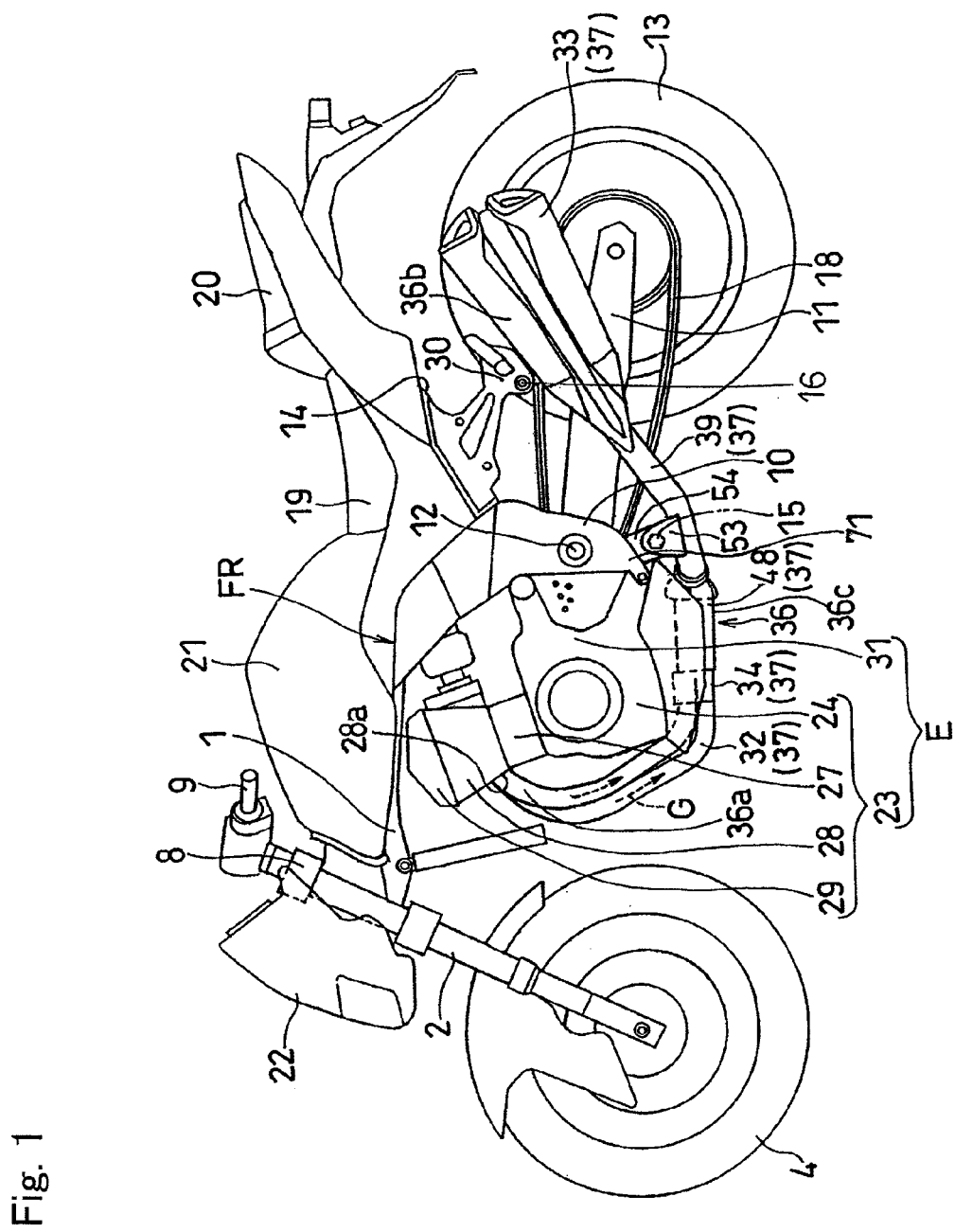
FIG. 1 is a side view showing a motorcycle equipped with an exhaust system according to a first preferred embodiment of the present invention.

In particular, FIG. 1 is a side view of a motorcycle equipped with the exhaust system according to a first preferred embodiment of the present invention. The motorcycle shown therein may be of a structure including a motorcycle frame structure FR made up of a main frame 1, forming a front frame portion of the motorcycle frame structure FR, and seat rails 14 connected rigidly with a rear portion of the main frame 1 and forming a rear frame portion of the motorcycle frame structure FR. A front fork 2 is pivotally mounted on a front portion of the main frame 1, and a front wheel 4 is rotatably supported by the front fork 2 at a lower end thereof. A steering handlebar 9 is mounted on an upper bracket 8, which concurrently supports an upper end of the front fork 2. A rear lower portion of the main frame 1 is formed with a swingarm bracket (pivot bracket) 10, and a swingarm 11 has its front end connected with this swingarm bracket 10 through a pivot pin 12 for movement up and down about the pivot pin 12. A rear drive wheel 13 is rotatably supported by a rear end of the swingarm 11 in any manner know to those skilled in the art and is drivingly coupled through a drive transmitting member 18 such as, for example, a substantially endless chain or belt with a motorcycle engine E that is mounted on a generally lower intermediate portion of the main frame 1.

The seat rails 14 referred to above supports a motorcycle rider's seat 19 and a passenger's seat 20 mounted thereon, and a fuel tank 21 containing an amount of fuel is positioned above the main frame 1, that is, at an upper portion of the motorcycle frame structure and generally intermediate between the handlebar 9 and the rider's seat 19. A fairing 22 made of a synthetic resin is mounted on a front portion of the motorcycle frame structure for covering the handlebar 9, an upper forward portion of the front fork 2, head lamps (not shown) displays and instruments (also not shown).

In the illustrated embodiment, the combustion engine E is employed in the form of, for example, a four cylinder, four stroke combustion engine and has an engine body 23 including a crankcase 24, a cylinder block 27, a cylinder head 28 mounted atop the cylinder block 27, a cylinder head cover 29 overhanging the cylinder head 28, and an oil pan (not shown) positioned below the crankcase 24, and a transmission 31.

The illustrated motorcycle also includes an exhaust system 36 for discharging exhaust gases G, emitted from the combustion engine E, to the atmosphere. This exhaust system 36 in turn includes four header pipes 32 fluid connected at an upstream end with respective exhaust ports 28a, defined in the cylinder head 28 in communication with combustion chambers (not shown) within the cylinder block 27, for guiding the exhaust gases G in a direction forwardly and downwardly from the combustion engine E. The exhaust system 36 furthermore includes two intermediate exhaust pipes 34, each fluid connected with respective downstream ends of two of the four header pipes 32, and a single exhaust collector pipe 38 fluid connected with respective downstream ends of the two intermediate exhaust pipes 34. The exhaust-collector pipe 38 has a downstream end fluid connected with left and right mufflers 33 through corresponding connecting pipes 39. Those various pipes including the header pipes 32, intermediate exhaust pipes 34, exhaust collector pipe 38 and connecting pipes 39 and the mufflers 33 altogether form an exhaust passageway 37.

Upstream portion 36a of the exhaust systems 36, that is, upstream ends of the header pipes 32 are supported by (connected with) the cylinder head 28 of the combustion engine E; the mufflers 33, which are downstream portions 36b, are supported by rear step brackets 30, fitted to the seat rails 14, by means of fastening members 16 such as, for example, bolts; and mounting brackets 53, fitted to a portion in the vicinity of upstream ends of the connecting pipes 39 (intermediate portions 36c as will be described later), are supported by support brackets 54, provided in a lower portion of the main frame 1 (swingarm bracket 10), by means of fastening members 15 such as, for example, bolts.

Figure 2:
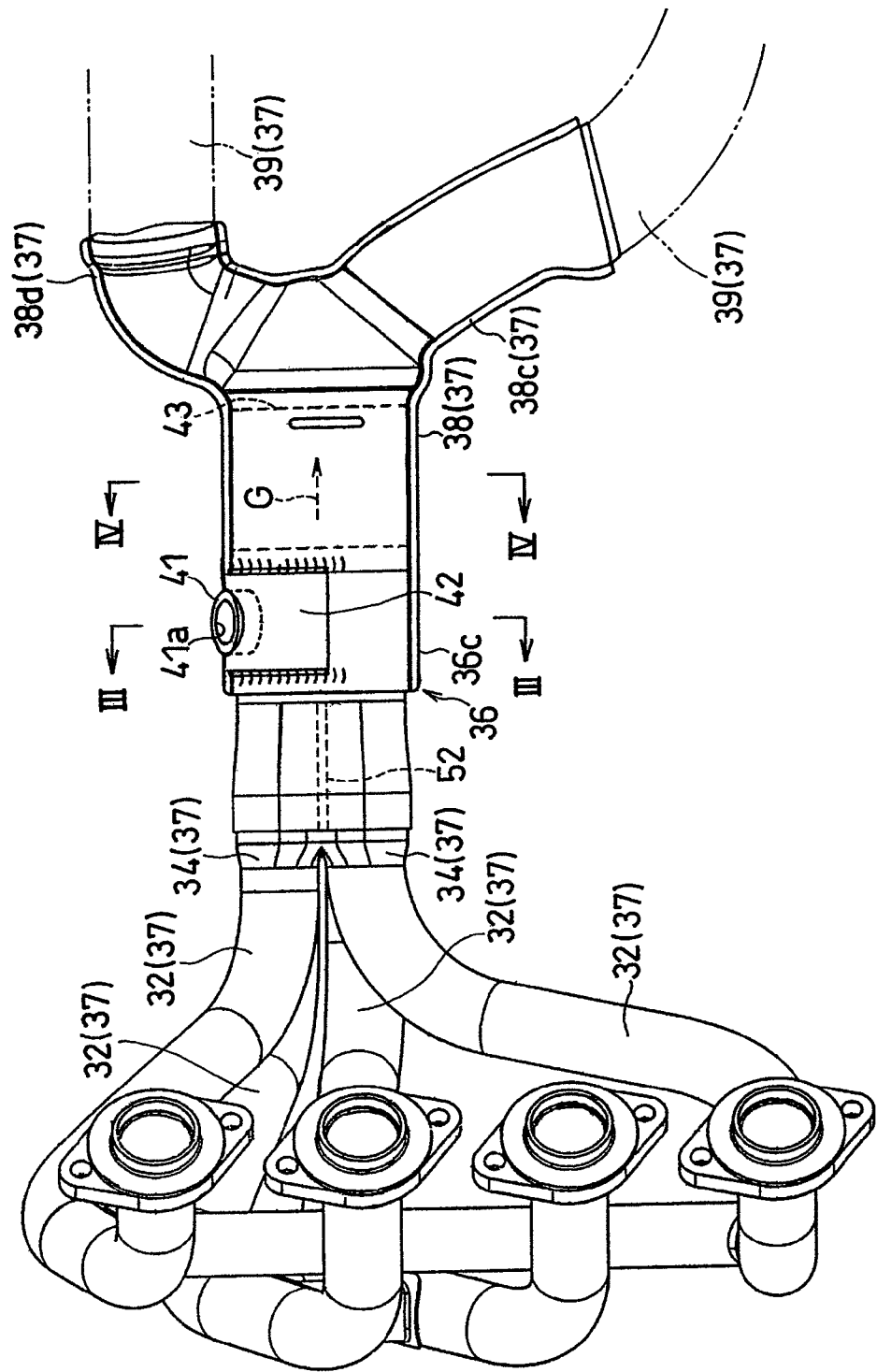
FIG. 2 is an enlarged top plan view showing the exhaust system.
Figure 5:
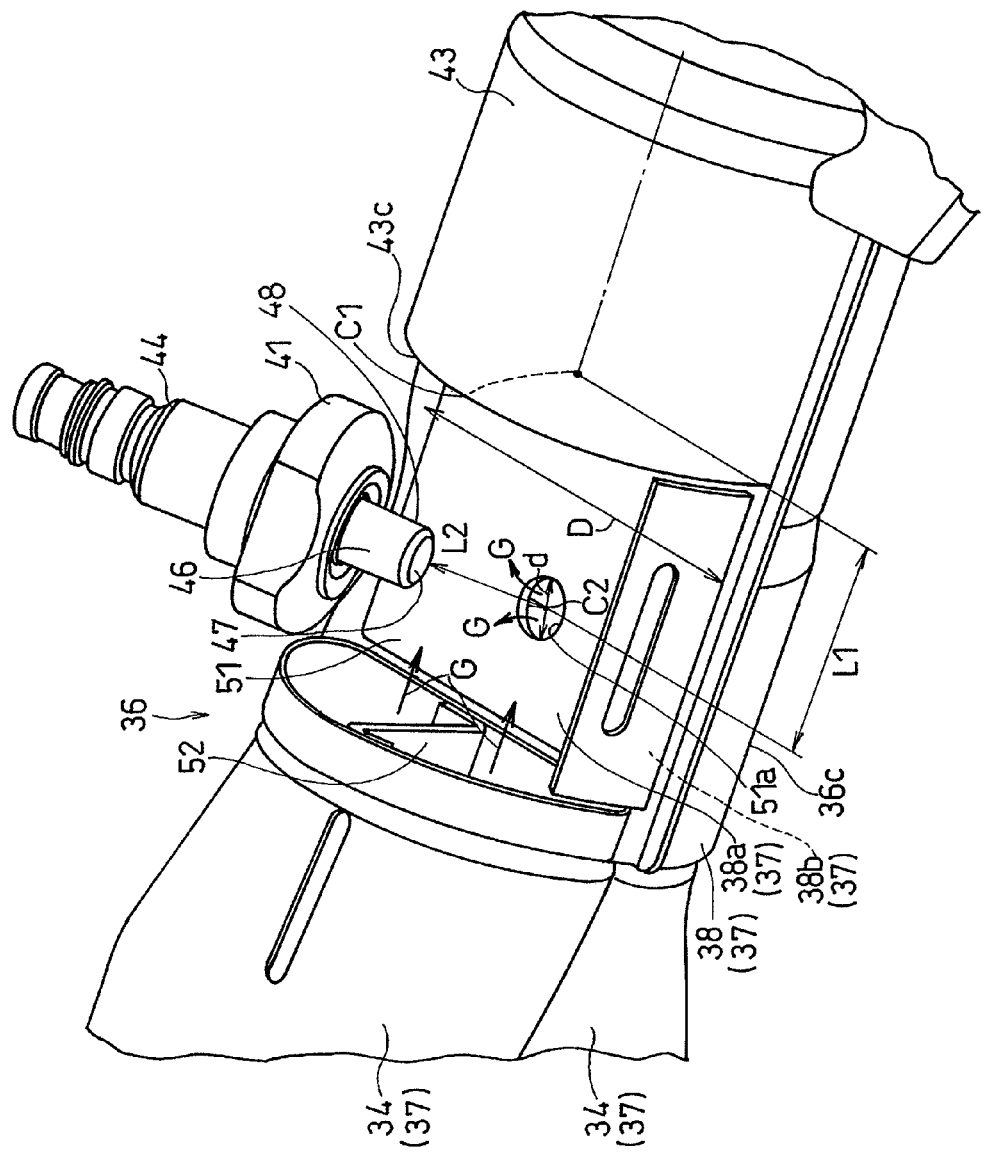
FIG. 5 is an enlarged perspective view of an exhaust collector pipe employed in the exhaust system referred to above.

FIG. 2 is a top plan view showing, on an enlarged scale, the exhaust system shown in FIG. 1. In the parallel four cylinder engine E, the four header pipes 32, one employed for each of the engine cylinders, are merged two groups of pipes, which are in turn merged into one pipe. In other words, two groups of the four header pipes 32, each group consisting of the two header pipes 32, are merged together by the two intermediate exhaust pipes 34, respectively, which are positioned one above the other and which are fluid connected with respective downstream ends of the two header pipes 32. The two intermediate exhaust pipes 34 are then merged into the single exhaust collector pipe 38 that is fluid connected with respective downstream ends of the two intermediate exhaust pipes 34. Each of the intermediate exhaust pipes 34 has its upstream end fluid connected with the two header pipes 32 and also has its interior divided into two passages by a vertically extending partition wall 52 as shown in FIG. 5. Each of the intermediate exhaust pipes 34 furthermore has its downstream end fluid connected with the corresponding exhaust collector pipe 38. In other words, an entrance to the exhaust-collector pipe 38 is fluid connected with four passages in the intermediate exhaust pipes 34 respectively to the four header pipes 32.

As shown in FIG. 2, a single catalytic converter 43 for substantially purifying the exhaust gases G before being emitted to the atmosphere is disposed within the exhaust collector pipe 38. The two exhaust passages upstream of the catalytic converter 43 disposed within the exhaust collector pipe 38 are substantially merged into a single pipe at a location downstream of the catalytic converter 43 and, for this purpose, a downstream end of the exhaust collector pipe 38 is formed integrally with two branched exhaust pipes 38c and 38d. Those two branched exhaust pipes 38c and 38d are fluid connected respectively with the connecting pipes 39. The two intermediate exhaust pipes 34 and the exhaust collector pipe 38 form an intermediate exhaust subsystem 36c of the exhaust system 36, that is, an intermediate passage portion of the exhaust passageway 37.

The reason that the catalytic converter 43 is disposed within the intermediate passage portion 36c of the exhaust system 36 will now be discussed. Specifically, if the catalytic converter were to be disposed at a location downstream of the exhaust system 36 shown in FIG. 1, the exhaust gases G will be introduced in the catalytic converter while the temperature of the exhaust gases G then flowing towards the catalytic converter is somewhat lowered due to a long travel in the exhaust passageway 37. At the same time, considering that the temperature of a major portion of the exhaust system 36 is relatively low at the time immediately after a cold start of the combustion engine E, a considerable reduction of the temperature of the exhaust gases flowing therethrough may take place. Under these circumstances, it may occur that a relatively large length of time is required before the catalyst contained in the catalytic converter is activated enough to allow the catalytic converter to accomplish an oxidation reaction, with the catalytic converter consequently failing to exhibit a sufficient exhaust gas purifying function. Accordingly, in view of the emissions limit of the exhaust gases, the catalytic converter 43 is shifted in position in an upstream direction and is thus disposed in the intermediate passage portion 36c so that immediately after the cold start of the combustion engine E, the catalyst can be readily activated enough to allow the catalytic converter to accomplish the oxidation reaction.

Figure 3:
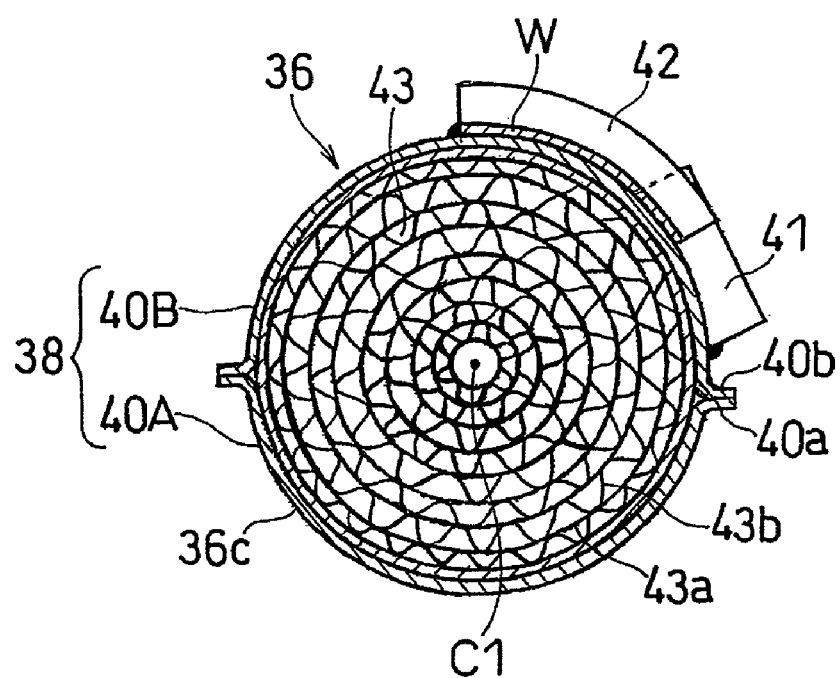
FIG. 3 is an enlarged cross-sectional view taken along the line III-III in FIG. 2.

As shown in FIG. 3 which is an enlarged cross-sectional view taken along the line III-III in FIG. 2, the catalytic converter 43 is of a honeycomb structure having a multiplicity of pores arranged in circumferential and radial directions. Specifically, this catalytic converter 43 includes a plurality of cylindrical bodies 43a made of a ceramic material and a plurality of corrugated tubular bodies 43b each having a corrugated peripheral wall and made of a ceramic material. The cylindrical bodies 43a and corrugated tubular bodies 43b are coaxially and alternately overlapped so as to form a honeycomb structure of a round sectional configuration having the multiplicity of axially extending pores defined therein. The cylindrical bodies 43a and the corrugated tubular bodies 43b carry a catalytic material such as, for example, platinum and rhodium deposited thereon. This catalytic converter 43 is so disposed within intermediate passage portion 36c of the exhaust system 36 with the axial direction of the cylindrical honeycomb structure, that is, the axial pores aligned with the direction of flow of the exhaust gases.

Figure 4A:
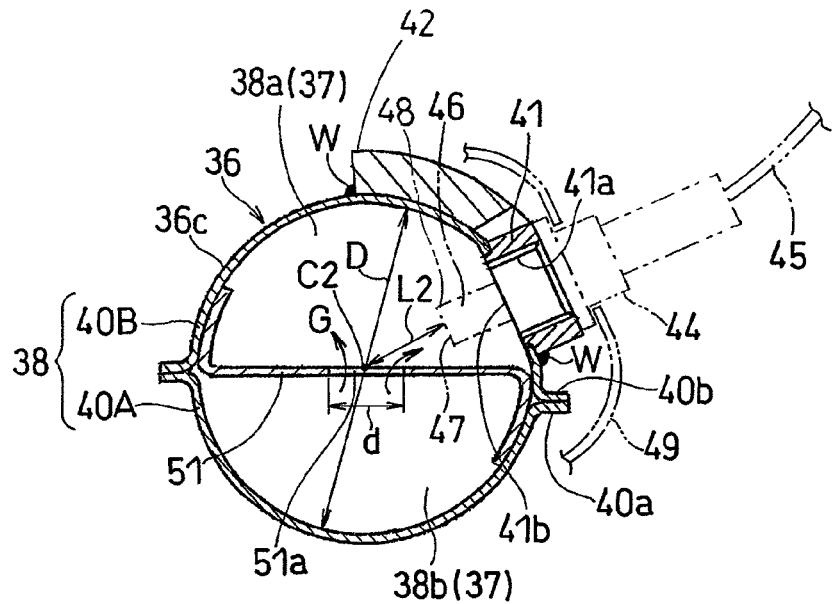
FIG. 4A is an enlarged cross-sectional view taken along the line IV-IV in FIG. 2.

As best shown in FIG. 4A showing an enlarged cross-sectional view taken along the line IV-IV in FIG. 2, a substantially horizontally extending partition plate 51 having a communicating hole 51a defined therein is disposed within the exhaust collector pipe 38 at a location upstream of the catalytic converter 43. By the partition plate 51, a portion of the interior of the exhaust passageway 37 within the exhaust collector pipe 38 and upstream of the catalytic converter 43 is divided into two passages or two introducing passages 38a and 38b positioned one above the other for introducing respective portions of the exhaust gases G into the catalytic converter 43. Accordingly, a region of the exhaust system 36 including the catalytic converter 43 and that portion of the exhaust passageway 37, which is divided into the introducing passages 38*a* and 38*b* by the partition plate 51 positioned upstream of the catalytic converter 43, can extend a substantial distance from the exits of the intermediate exhaust pipes 34 to the exit of the catalytic converter 43 and therefore, an output of the combustion engine E at a medium speed region can be increased.

The exhaust collector pipe 38 is of two-piece tube design. More specifically, as best shown in FIG. 4A, the exhaust collector pipe 38 includes a pair of semicircular sectioned wall members 40A and 40B each formed at its opposite sides with lugs 40*a* or 40*b* by the use of a bending technique. This exhaust collector pipe 38 is formed by welding the lugs 40*a* and 40*b* together while the semicircular sectioned wall members 40A and 40B are positioned one above the other with the lugs 40*a* of the wall member 40A held in contact with the lugs 40*b* of the wall member 40B. The catalytic converter 43 referred to above is arranged within the space delimited between the semicircular sectioned wall members 40A and 40B and rearwardly of the partition plate 51.

As shown in FIG. 2, another portion of the exhaust collector pipe 38 upstream of that portion of the exhaust collector pipe 38 where the catalytic converter 43 is accommodated is provided with a sensor boss 41, and a weight 42 for suppressing vibrations is disposed in the vicinity of the sensor boss 41. As shown in FIG. 3, the sensor boss 41 is positioned on the upper half 40B of the exhaust collector pipe 38, and has an internally threaded hole 41*a* formed therein for receiving an exhaust gas sensor 44 threaded thereinto as shown by the double dotted line in FIG. 4A.

The exhaust gas sensor 44 is disposed on the upper wall member 40B and is supported by the sensor boss 41 so as to extend slantwise into the upper introducing passage 38*a* with its leading end 47 oriented towards the communicating hole 51*a* in the partition plate 51. This exhaust gas sensor 44 is utilized to detect a composition such as, for example, oxygen in the illustrated embodiment, contained in the exhaust gases G flowing at that portion of the exhaust passageway 37 upstream of the catalytic converter 43 for the purpose of facilitating a reburn of the exhaust gases G within the catalytic converter 43 shown in FIG. 2. Specifically, in the illustrated embodiment, the exhaust gas sensor 44 is so arranged and so positioned that the amount of oxygen contained in the exhaust gases G within the introducing passages 38*a* and 38*b*, which are mixed together through the communicating hole 51*a* defined in the partition plate 51.

A detection signal outputted from the exhaust gas sensor 44 and indicative of the amount of oxygen detected thereby can be supplied through an electric cord 45 (lead line) to an engine controller (not shown). The engine controller is operable to control, based on the detection signal so supplied, the air-fuel ratio in the fuel intake system and the amount of a secondary air to be introduced into the exhaust ports to thereby facilitate a catalytic reaction within the catalytic converter 43. Control of the air-fuel ratio can be accomplished by, for example, adjustment of the amount of fuel to be injected.

The sensor boss 41 and the weight 42 are secured to the exhaust collector pipe 38 through weld deposits W. The exhaust gas sensor 44 is threaded into the internally threaded hole 41*a* defined in the sensor boss 41 as shown by the double dotted line in FIG. 4A. A portion of the exhaust collector pipe 38, where the partition plate 51 is arranged, has a round cross-sectional shape of an inner diameter D excluding a portion provided with the sensor boss 41.

The communicating hole 51*a* defined in the partition plate 51 is utilized to establish a communication between the upper introducing passage 38*a* and the lower introducing passage 38*b*, and the presence of the communicating hole 51*a* allows the exhaust gases G flowing within the upper introducing passage 38*a* and the exhaust gases G flowing within the lower introducing passage 38*b* to be mixed together and, accordingly, exhaust gases G flowing through the four header pipes 32 (FIG. 2) are in a mixed state at a location downstream of the upper and lower introducing passages 38*a* and 38*b*. Considering that respective cycles of strokes taking place in the cylinders of the combustion engine E are generally displaced in phase relative to each other, mixing of the exhaust gases G flowing through the communication holes 51*a* can be facilitated by the effect of a phase difference of exhaust pulsation. In view of this, the mere provision of the single exhaust gas sensor 44 to the communicating hole 51*a* or its vicinity is effective to detect the composition of the exhaust gases G present in the entire exhaust passageway.

Referring now to FIG. 5, the communicating hole 51*a* is defined at a location somewhat spaced a distance from the catalytic converter 43 in a direction upstream thereof. Specifically, the communicating hole 51*a* is preferably defined in the partition plate 51 at a location spaced a distance L1 from the geometric center C1 of an upstream end face 43*c* of the catalytic converter 43, which distance L1 preferably falls within the range of 0.3 to 0.6 D and, more preferably, within the range of 0.4 to 0.5 D, where D is the inner diameter of the exhaust collector pipe 38.

The communicating hole 51*a* is somewhat spaced from the upstream end face 43*c* of the catalytic converter 43, as hereinabove described, because there is the possibility that if the communicating hole 51*a* is defined at a location immediately preceding the catalytic converter 43 with respect to the direction of flow of the exhaust gases G, the exhaust gases G will be introduced into the catalytic converter 43 before they are sufficiently mixed through the communicating hole 51*a* and the result of detection will indicate an inaccurate component concentration of the mixed exhaust gases G. This possibility can be eliminated when the communicating hole 51*a* is defined at the location spaced the distance L from the upstream end face of the catalytic converter 43 as hereinabove discussed.

The exhaust gas sensor 44 includes a gas introducing portion 46 of a substantially cylindrical configuration having a leading end 47 and a side face 48. The exhaust gas sensor 44 is so designed and so structured as to detect the amount of oxygen of the exhaust gases G then introduced into the gas introducing portion 46 through perforations (not shown) defined in the side surface 48 and a hole (not shown) defined in the leading end 47. As hereinabove described, the exhaust gas sensor 44 is so positioned as to permit the leading end 47 of the exhaust gas sensor 44 to be held at the position in the vicinity of the communicating hole 51 within the upper introducing passage 38*a* or between the communicating hole 51*a* and the catalytic converter 43. In the instance as shown in FIG. 5, the exhaust gas sensor 44 is so positioned that the leading end 47 thereof can be oriented towards a geometric center of the communicating hole 51*a* with the longitudinal axis of the gas introducing portion 46 aligned with a radial direction of the exhaust collector pipe 38. With the exhaust gas sensor 44 so positioned as hereinabove described, the distance L2 between the leading end 47 and the geometric center C2 of the communicating hole 51*a* on an upper surface of the partition plate 51 is so chosen as to be preferably within the range of 0.15 to 0.40 D and, more preferably, within the range of 0.20 to 0.35 D relative to the inner diameter D of the exhaust collector pipe 38. If the leading end 47 of the exhaust gas sensor 44 is too close to or far from the communicating hole 51a, the leading end 47 will be positioned in a region where mixing of the exhaust gases G takes place insufficiently, accompanied by reduction in accuracy of detection of the composition of the exhaust gases G. Accordingly, positioning of the leading end 47 too close to or too far from the communicating hole 51a should be avoided.

Figure 6:
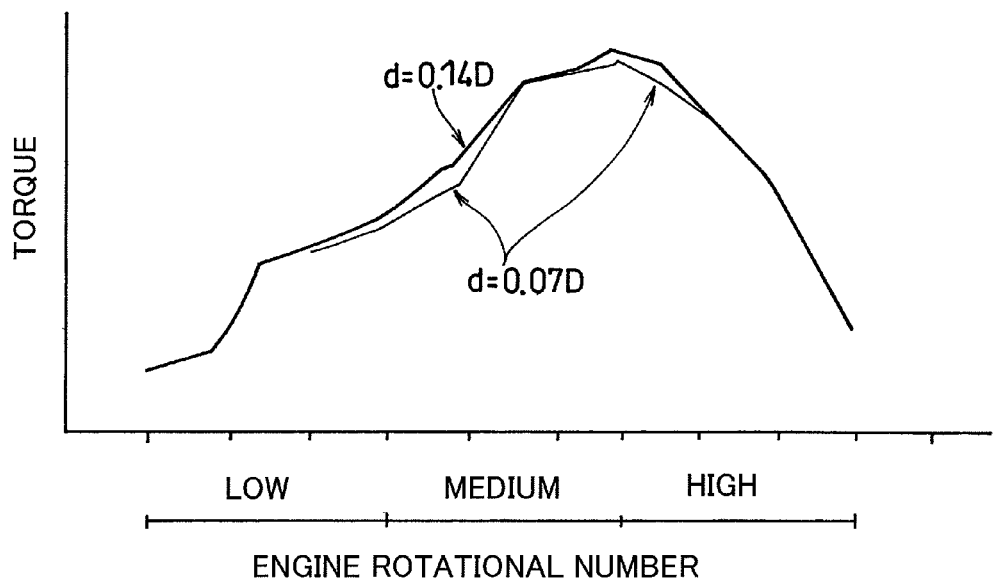
FIG. 6 is a chart representing data on the engine performance showing the magnitude of torque relative to the rotational speed of the combustion engine, which were obtained during experiments conducted in connection with the exhaust systems, when a communicating hole has a diameter equal to 0.07 D and 0.14 D.
Figure 7:
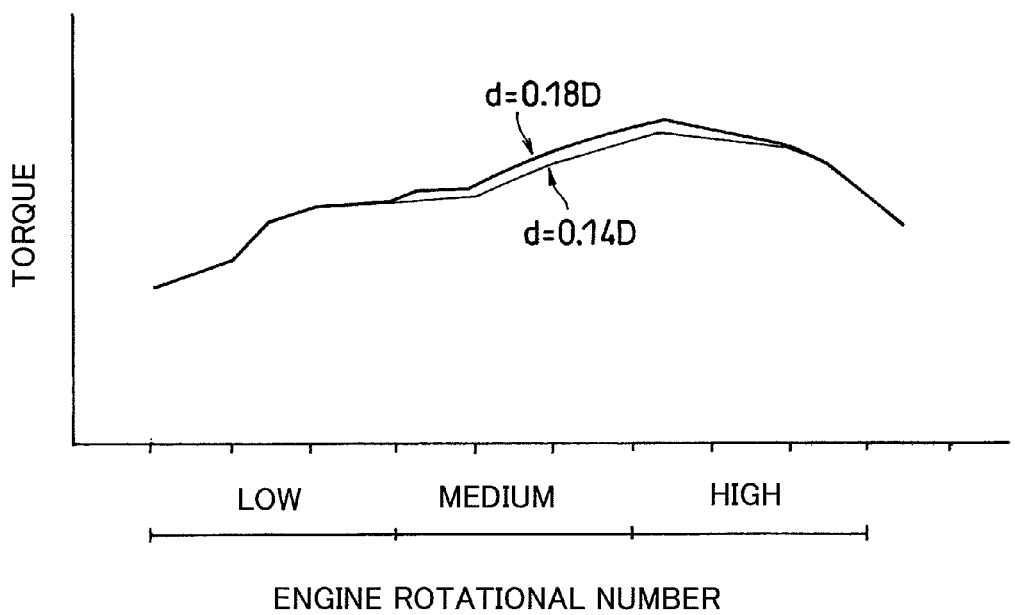
FIG. 7 is a chart representing data on the engine performance showing the magnitude of torque relative to the rotational speed of the combustion engine, which were obtained during experiments conducted in connection with the exhaust systems, when a communicating hole has a diameter equal to 0.14 D and 0.18 D.

FIGS. 6 and 7 illustrate data on the performance of the motorcycle engine obtained as a result of series of experiments conducted. Specifically, FIG. 6 illustrates two curves indicative of how the torque changes with change of the rotational speed of the motorcycle engine, which is exhibited when the diameter d of the communicating hole 51a is chosen to be 0.07 D and 0.14 D, respectively, and FIG. 7 illustrates similarly two curves indicative of how the torque changes with change of the rotational speed of the motorcycle engine, which is exhibited when the diameter d of the communicating hole 51a is chosen to be 0.14 D and 0.18 D, respectively.

According to the chart of FIG. 6, when the diameter d of the communicating hole 51a is 0.07 D, it can be observed that the torque drops considerably at medium and high speed regions as compared with the case in which the diameter d of the communicating hole 51a is chosen to be 0.14 D. In particular, the drop in torque is considerable at a first half of the medium speed region (about 5,000 to 6,000 rpm). On the other hand, according to the chart of FIG. 7, when the diameter d of the communicating hole 51a is 0.14 D, it can be observed that the torque drops at the entire medium speed region (about 5,000 to 8,000 rpm) as compared with the case in which the diameter d of the communicating hole 51a is chosen to be 0.18 D.

The following results could be obtained when the concentration of the exhaust gases was measured in respective models in which the partition plate 51 has no communicating hole defined therein, the communicating hole 51a has a diameter d which is 0.14 D and the communicating hole 51a has a diameter d which is 0.18 D, respectively.

Comparing the models in which the communicating hole 51a has a diameter d which is 0.14 D and in which the partition plate 51 has no communicating hole defined therein, the concentration of CO and the concentration of THC (Total HC) could be improved about 8% and about 6%, respectively, although the concentration of NOx could be increased about 21%. Comparing the models in which the communicating hole 51a has a diameter d which is 0.18 D and in which the partition plate 51 has no communicating hole defined therein, the concentration of NOx, the concentration of CO and the concentration of THC (Total HC) could be improved about 5%, about 16% and about 11%, respectively. Also, as compared with the model in which the communicating hole 51a has a diameter d which is 0.14 D, the model in which the communicating hole 51a has a diameter d which is 0.18 D has exhibited that, although the concentration of CO increased about 3%, the concentration of THC and the concentration of NOx were improved about 10% and about 26%, respectively.

In view of the above, it can be readily understood that as a result that the accurate amount of oxygen could be detected with the mixing of the exhaust gases G having been facilitated, a proper control of the air-fuel ratio and the amount of the secondary air to be introduced can be achieved, thereby increasing the substantial purifying performance of the catalytic converter 43.

Considering the engine performance and the actual measurements of the concentration of the exhaust gases discussed above, the diameter d of the communicating hole 51a, which is desirable in accomplishing the substantial purification of the exhaust gases while an undesirable reduction in engine performance is avoided, is preferably within the range of 0.10 to 0.25 D and, more preferably, within the range of 0.15 to 0.20 D.

In the exhaust system of the structure as hereinbefore described, the four header pipes 32 fluid connected with the four cylinder combustion engine E shown in FIG. 1 are divided into the two introducing passages 38a and 38b by means of the partition plate 51 disposed within the exhaust collector pipe 38 as shown in FIG. 4A and, accordingly, the exhaust passageway 37 so divided can extend a distance to the catalytic converter 43, thereby allowing the engine output at the medium speed region to be increased. Also, since the introducing passages 38a and 38b are communicated with each other through the communicating hole 51a defined in the partition plate 51, the composition of the exhaust gases flowing in the entire exhaust passageway can be detected by the single exhaust gas sensor 44 and, therefore, the number of exhaust gas sensors to be used can be reduced to thereby reduce the number of component parts and the weight, resulting in reduction of the cost. In addition, since the exhaust gas sensor 44 requires the lead line 45 and a protective covering 49 for protecting the sensor 44 from muddy water to be fitted thereto, reduction in number of the exhaust gas sensors 44 result in reduction of the number of lead lines, allowing the covering 49 to be downsized and as a result, the number of component parts, the weight and the cost can also be reduced.

While the exhaust collector pipe 38 is formed with two semicircular sectioned plates 40A and 40B jointed together, a fitting area of the exhaust collector pipe 38, where the exhaust gas sensor 44 is to be mounted, must have the sensor boss 41 connected thereto. The use of the only one exhaust gas sensor 44 is particularly advantageous in that connection of the sensor boss 41 with the exhaust collector pipe 38 is required to be achieved at one place and, hence, the number of processing and assembling steps of the semicircular sectioned plates 40A and 40B can be reduced. The use of the single exhaust gas sensor 44 is additionally advantageous in that as shown in FIG. 4A, the cross-sectional shape of the exhaust collector pipe 38 may be round in an area equal to or more than ¾ circumference thereof.

Figure 4B:
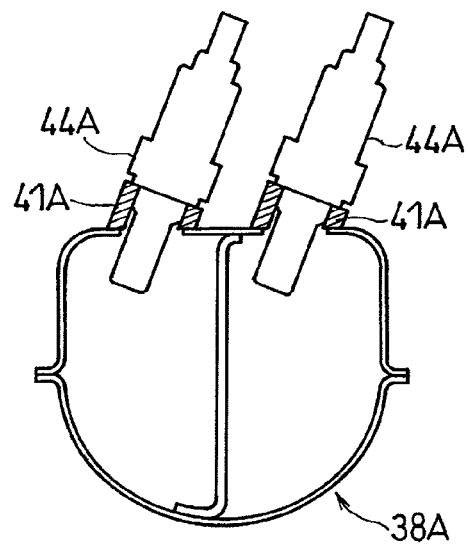
FIG. 4B is a view similar to FIG. 4A, showing the conventional design.

While the sensor boss 41 has an inner end face 41b representing a flat shape, it is well recognized by those skilled in the art that when the cross-sectional shape of the exhaust collector pipe represents a non-circular shape, the engine output particularly at the low speed region will decrease as compared with the round cross-sectional shape of the exhaust collector pipe. By way of example, in the case of the conventional exhaust collector pipe 38A provided with two exhaust gas sensors 44A as shown in FIG. 4B, the flat sensor boss 41A used therein is large and a portion of the circumference of the exhaust collector pipe 38A, which is a part of the round shape, occupies about ½ of the circumference thereof. However, in the present invention, as shown in FIG. 4A, because of the use of the single exhaust gas sensor 44, about ¾ of the circumference of the exhaust collector pipe 38 represents a part of the round shape and, accordingly, the output performance of the combustion engine can be increased.

In view of the fact that the lower introducing passage 38b does not require the use of any exhaust gas sensor, since there is no need to fit the exhaust gas sensor 44 to the lower introducing passage 38b, it is possible to secure a large angle of bank while an undesirable contact of the exhaust sensor 44 and a covering 49 therefor with any obstructions during the travel of the motor vehicle is avoided. Also, while a lower portion of the exhaust collector pipe 38 is apt to be chilled under the influence of muddy water or the like and the sensor 44 tends to be adversely affected by a condensate liquid of the exhaust gases G generated as a result of cooling, those problems can be avoided as a result that no exhaust gas sensor 44 is required in the lower introducing passage 38b.

It is to be noted that although that portion of the exhaust collector pipe 38 downstream of the catalytic converter 43 has been shown and described as comprised of the two branched exhaust pipes 38c and 38d, it may be comprised of a single exhaust passage with the branched exhaust pipes 38c and 38d eliminated. In that case the exhaust collector pipe 38 can be fluid connected with a single muffler through the single exhaust pipe 39. Also, if required, a partition plate for dividing the exhaust passageway 37 into two passages may be provided in the vicinity of a portion of the exhaust collector pipe 38 downstream of the catalytic converter 43. It is also to be noted that in the foregoing embodiment hereinbefore fully described, the intermediate exhaust pipes 34 shown in FIG. 2 may be dispensed with.

Also, the number of the partition plate 51 may not be always limited to one such as shown in FIG. 4A and may be employed two or more so that three or more introducing passages 38a and 38b can be formed. In that case the exhaust gas sensor 44 has to be brought in position close to the communicating passage 51a defined in any one of those partition plates 51.

Figure 8:
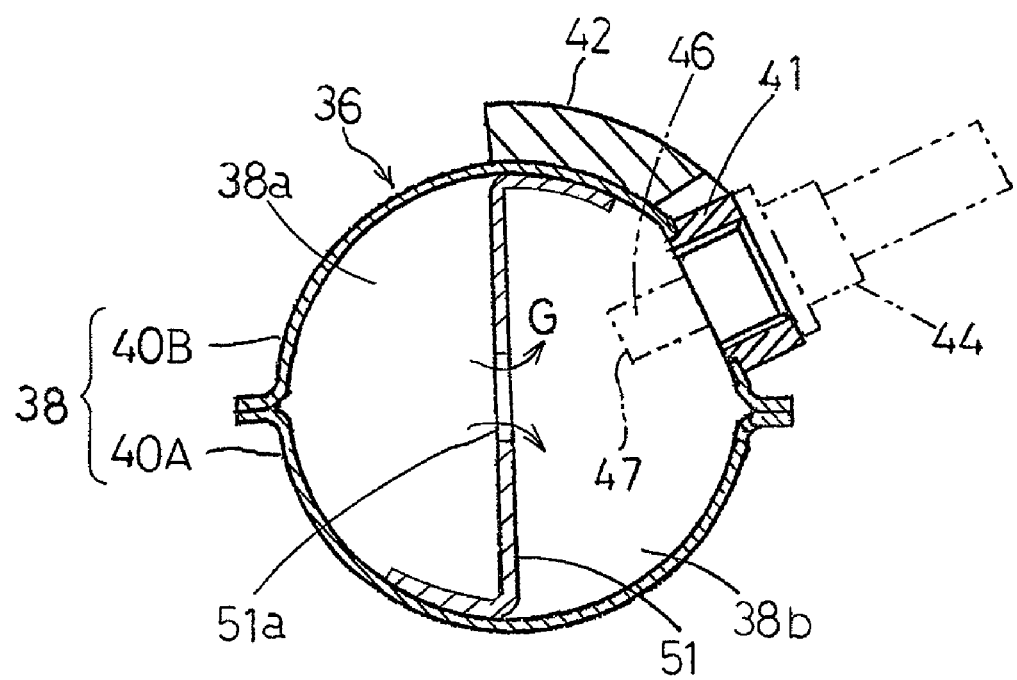
FIG. 8 is an enlarged sectional view showing the exhaust system according to a second preferred embodiment of the present invention.

In addition, as shown in FIG. 8, the exhaust collector pipe 38 may be divided into left and right introducing passages 38a and 38b by means of the partition plate 51 that extends vertically. In this case, the sensor boss 41 has to be positioned on an upper half 40B of one of the introducing passages 38a and 38b with the leading end 47 of the gas introducing portion 46 of the exhaust gas sensor 44 oriented diagonally downwardly and this arrangement is particularly advantageous in that the angle of bank of the motorcycle or any other motor vehicle can be increased.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although the present invention has been shown and described as applied to the exhaust system including the catalytic converter 43, the present invention can be equally applied to the exhaust system including no catalytic converter. In that case the exhaust gas sensor 44 (shown in FIG. 3) may be utilized to detect the composition of the exhaust gases G so that the air-fuel ratio can be adjusted to substantially purify the exhaust gases G.

Also, the exhaust gas sensor 44 may be of any known type, provided that the sensor 44 can detect the amount of oxygen contained in the exhaust gases and/or the air-fuel ratio. In addition, although in the foregoing embodiment reference has been made to the exhaust system employed in the motorcycle, the present invention can be equally applied to the exhaust system employed in any other motor vehicle equipped with a combustion engine.

Accordingly, such changes and modifications are, unless they depart from the scope of the present invention as delivered from the claims annexed hereto, to be construed as included therein.

What is claimed is:

1. An exhaust system for discharging exhaust gases through an exhaust passageway, emitted from a multi-cylinder combustion engine mounted on a motor vehicle, which system comprises:

a partition plate dividing the exhaust passageway into a plurality of juxtaposed exhaust passages and having a communicating hole defined at a widthwise center portion of the partition plate; and an exhaust gas sensor, positioned at a location close to the communicating hole, for detecting a composition of the exhaust gases.

2. The exhaust system as claimed in claim 1, further comprising a catalytic converter disposed in a portion of the exhaust passageway downstream of the communicating hole with respect to the direction of flow of the exhaust gases.

3. The exhaust system as claimed in claim 2, further comprising a plurality of header pipes fluid connected with a plurality of engine cylinders of the combustion engine and forming a part of the exhaust passageway; and an exhaust collector pipe fluid connected with the plural header pipes which are merged together; and wherein the catalytic converter is disposed within the exhaust collector pipe, and wherein the exhaust gas sensor is positioned in the vicinity of and on an upstream side of the catalytic converter.

4. The exhaust system as claimed in claim 3, wherein an exhaust passage in the exhaust collector pipe upstream of the catalytic converter is divided into upper and lower introducing passages through which the exhaust gases are introduced into the catalytic converter, and the exhaust sensor is fitted to the exhaust collector pipe so as to confront the upper introducing passage.

5. The exhaust system as claimed in claim 3, wherein a distance L1 from a geometric center of the communicating hole to an upstream end face of the catalytic converter is chosen to be within the range of 0.3 to 0.6 D, where D represents an inner diameter of the exhaust collector pipe.

6. The exhaust system as claimed in claim 5, wherein the distance L1 is chosen to be within the range of 0.4 to 0.5 D.

7. The exhaust system as claimed in claim 3, further comprising a sensor boss, mounted on the exhaust collector pipe, for supporting the exhaust gas sensor and a vibration suppressing weight disposed in the vicinity of the sensor boss.

8. The exhaust system as claimed in claim 3, wherein the exhaust collector pipe has a circumference, and ¾ or more of the circumference represents a round shape in cross-section.

9. The exhaust system as claimed in claim 1, wherein the exhaust gas sensor has a leading end oriented towards a geometric center of the communicating hole and is disposed diagonally relative to the partition plate.

10. The exhaust system as claimed in claim 9, wherein a distance L2 between the leading end of the exhaust gas sensor and the geometric center of the communicating hole is chosen to be within the range of 0.15 to 0.40 D, where D represents an inner diameter of the exhaust collector pipe.

11. The exhaust system as claimed in claim 10, wherein the distance L2 is chosen to be within the range of 0.20 to 0.35 D.

12. The exhaust system as claimed in claim 1, wherein the communicating hole has a diameter d which is chosen to be within the range of 0.10 to 0.25 D, where D represents an inner diameter of the exhaust collector pipe.

13. The exhaust system as claimed in claim 12, wherein the diameter d is chosen to be within the range of 0.15 to 0.20 D.

14. The exhaust system as claimed in claim 1, wherein the exhaust gas sensor is operable to detect an amount of oxygen.

15. The exhaust system as claimed in claim 1, wherein the combustion engine has four engine cylinders.

16. A motorcycle comprising the exhaust system described in claim 1.

17. An exhaust system for discharging exhaust gases through an exhaust passageway, emitted from a multi-cylinder combustion engine mounted on a motor vehicle, which system comprises:
  a partition plate dividing the exhaust passageway into a plurality of juxtaposed exhaust passages and having a communicating hole defined therein; and
  an exhaust gas sensor positioned at a location close to the communicating hole and disposed diagonally relative to the partition plate so as to have a leading end for detecting a composition of the exhaust gases oriented towards a geometric center of the communicating hole.

18. An exhaust system for discharging exhaust gases through an exhaust passageway, emitted from a multi-cylinder combustion engine mounted on a motorcycle, which system comprises:
  a plurality of header pipes fluid connected with a plurality of engine cylinders of the combustion engine and forming a part of the exhaust passageway;
  an exhaust collector pipe fluid connected with the plural header pipes which are merged together,
  a catalytic converter disposed within the exhaust collector pipe;
  a partition plate dividing the exhaust passageway in the exhaust collector pipe upstream of the catalytic converter into upper and lower introducing passages through which the exhaust gases are introduced into the catalytic converter and having a communicating hole defined therein; and
  an exhaust gas sensor, positioned at a location close to the communicating hole, for detecting a composition of the exhaust gases;
  wherein the exhaust gas sensor is positioned in the vicinity of and on an upstream side of the catalytic converter and fitted to the exhaust collector pipe so as to confront the upper introducing passage.

\* \* \* \* \*